US010562440B1

(12) United States Patent
Julian et al.

(10) Patent No.: US 10,562,440 B1
(45) Date of Patent: Feb. 18, 2020

(54) DIRECTIONAL LIGHTING SYSTEM

(71) Applicants: Danial Julian, Athens, IL (US);
Zhongren Zhang, San Jose, CA (US)

(72) Inventors: Danial Julian, Athens, IL (US);
Zhongren Zhang, San Jose, CA (US)

( * ) Notice: Subject to any disclaimer, the term of this patent is extended or adjusted under 35 U.S.C. 154(b) by 0 days.

(21) Appl. No.: 16/266,923

(22) Filed: Feb. 4, 2019

(51) Int. Cl.
| B60Q 1/24 | (2006.01) |
| F21S 41/36 | (2018.01) |
| H05B 37/02 | (2006.01) |
| F21S 8/00 | (2006.01) |
| F21V 23/00 | (2015.01) |
| G06F 3/01 | (2006.01) |
| H05B 33/08 | (2020.01) |
| G06T 7/70 | (2017.01) |
| F21Y 115/10 | (2016.01) |

(52) U.S. Cl.
CPC .............. *B60Q 1/245* (2013.01); *F21S 8/003* (2013.01); *F21S 41/36* (2018.01); *F21V 23/005* (2013.01); *G06F 3/012* (2013.01); *G06T 7/70* (2017.01); *H05B 33/0842* (2013.01); *H05B 37/0263* (2013.01); *H05B 37/0272* (2013.01); *F21Y 2115/10* (2016.08)

(58) Field of Classification Search
None
See application file for complete search history.

(56) References Cited

U.S. PATENT DOCUMENTS

| 4,353,110 A | 10/1982 | Ellis |
| 5,931,576 A | 8/1999 | Kreysar et al. |
| 6,191,547 B1 | 2/2001 | Fricke et al. |
| 6,879,263 B2 | 4/2005 | Pederson et al. |
| 6,902,308 B2 | 6/2005 | Love |
| 7,226,185 B2 | 6/2007 | Dolgin et al. |
| 7,410,282 B2 | 8/2008 | Eichelberger et al. |
| 8,061,868 B2 | 11/2011 | Dubord |
| 8,274,226 B1* | 9/2012 | Sikora ................ B60R 1/1207 315/77 |
| 8,456,768 B2 | 6/2013 | Shih et al. |
| 8,764,259 B2 | 7/2014 | Schug |
| 8,836,541 B2 | 9/2014 | Fidanza |
| 8,950,912 B2 | 2/2015 | Chen |
| 9,188,302 B2 | 11/2015 | Ovenshire et al. |
| 9,243,773 B2 | 1/2016 | Funk et al. |
| 9,829,174 B2 | 11/2017 | Schouboe |
| 9,863,610 B2 | 1/2018 | Duckworth |
| 9,884,691 B2 | 2/2018 | Jha et al. |
| 9,995,462 B2 | 6/2018 | Nankil |

(Continued)

Primary Examiner — Jany Richardson

(57) ABSTRACT

A directional lighting system may include a plurality of lights positioned on a singular planar surface. A plurality of stationary reflectors may also be provided, each reflector positioned adjacent to each of the plurality of lights. The stationary reflectors may be positioned on the single planar surface in an orientation so as to provide directional illumination of one of the plurality of lights in a different direction relative to another of the plurality of lights. The single planar surface may define a surface of a printed circuit board (PCB) to which the plurality of lights are mounted. The directional lighting system may further include a controller in communication with the plurality of lights. The controller may include one or more preset lighting functions, whereby a user may select one of the one or more preset buttons to illuminate specific lights of the plurality of lights.

18 Claims, 12 Drawing Sheets

(56) References Cited

U.S. PATENT DOCUMENTS

| | | | |
|---|---|---|---|
| 2002/0105432 A1* | 8/2002 | Pederson | B60Q 1/2611 340/815.45 |
| 2004/0263346 A1 | 12/2004 | Neal | |
| 2009/0230884 A1* | 9/2009 | Van Doorn | H05B 33/0803 315/297 |
| 2009/0323330 A1* | 12/2009 | Gordin | F21V 5/04 362/235 |
| 2011/0032720 A1 | 2/2011 | Chen et al. | |
| 2011/0267455 A1 | 11/2011 | Gotz et al. | |
| 2013/0327966 A1 | 12/2013 | Fidler et al. | |
| 2017/0368982 A1* | 12/2017 | Dellock | B60Q 1/085 |

\* cited by examiner

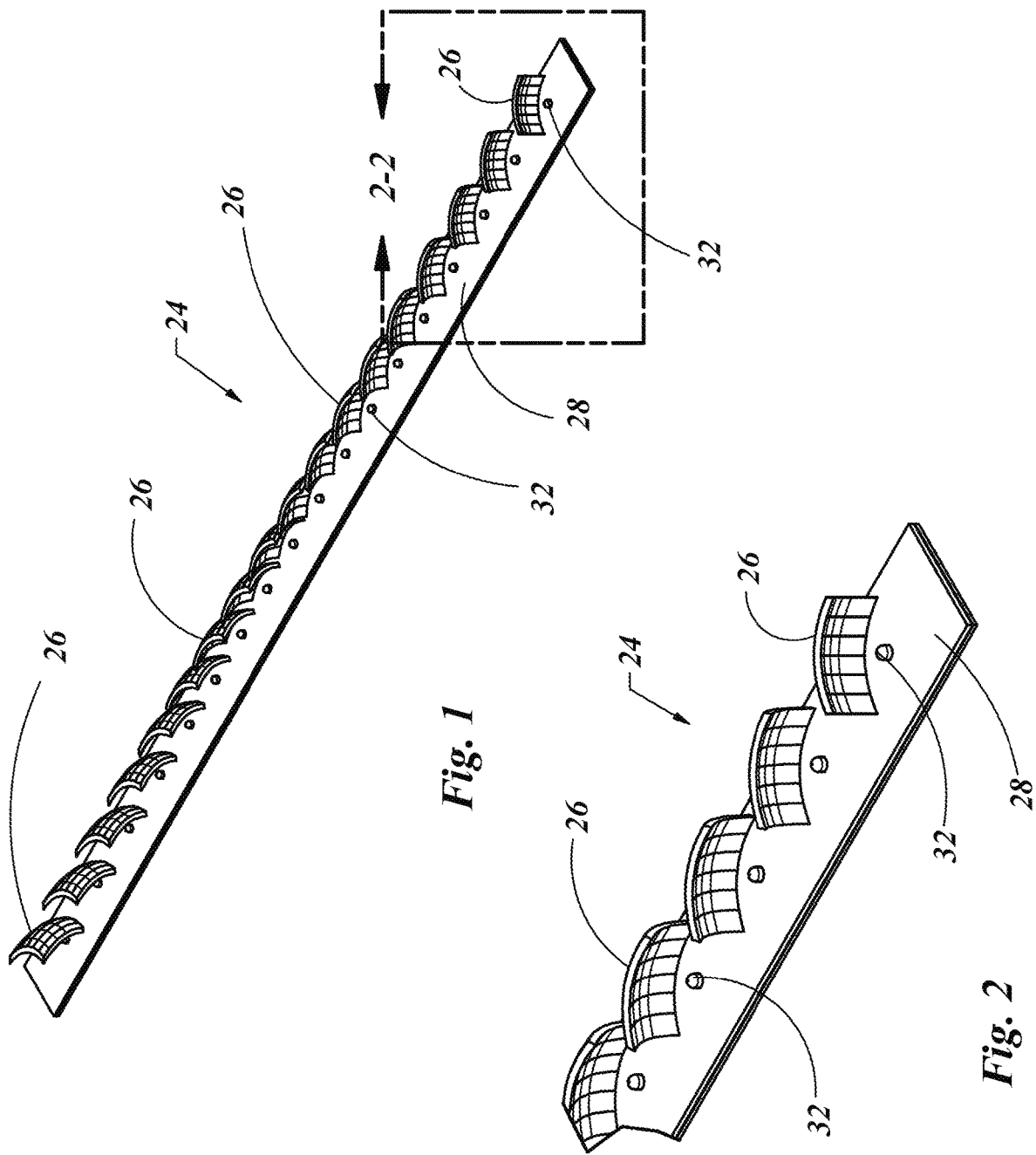

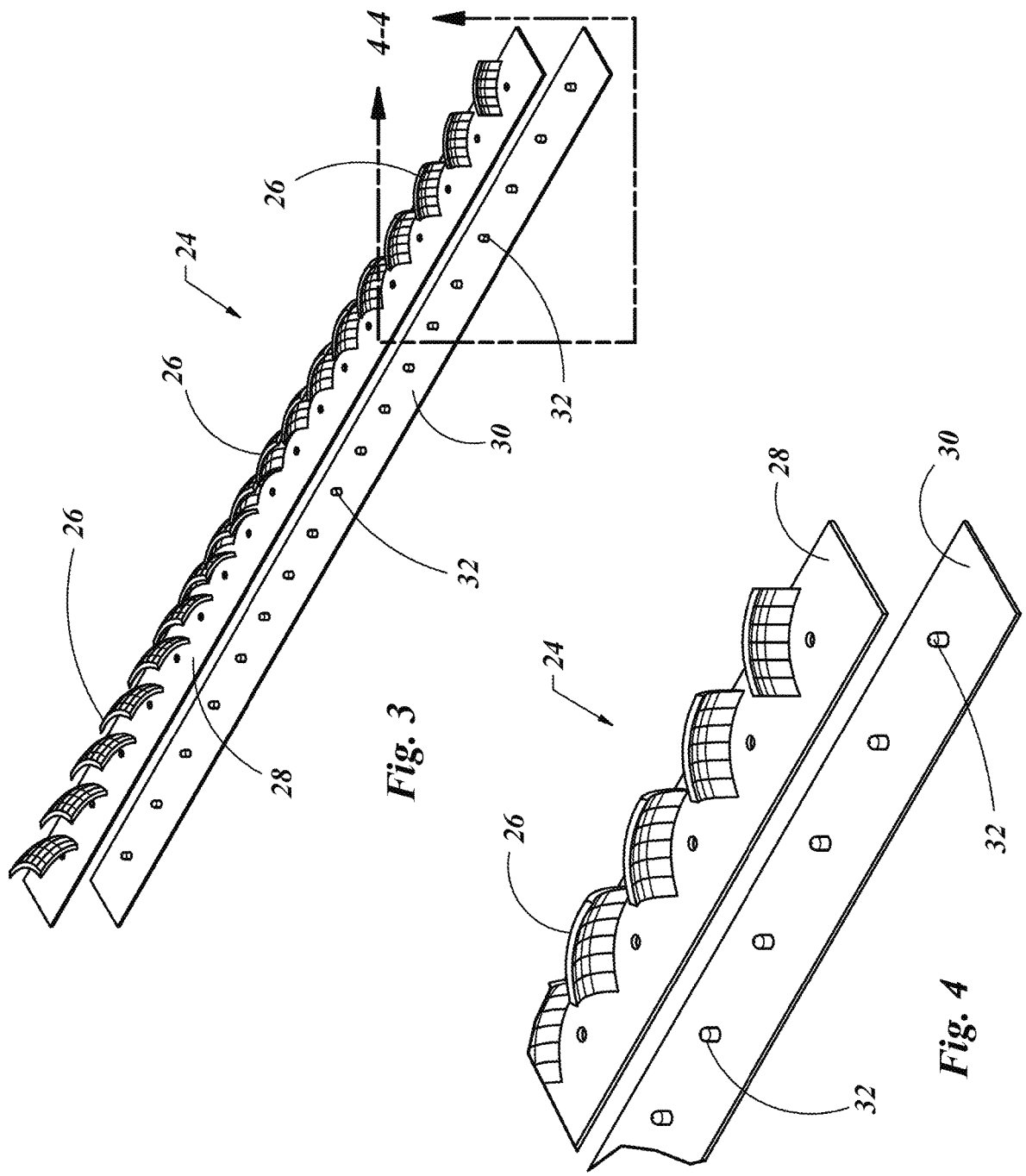

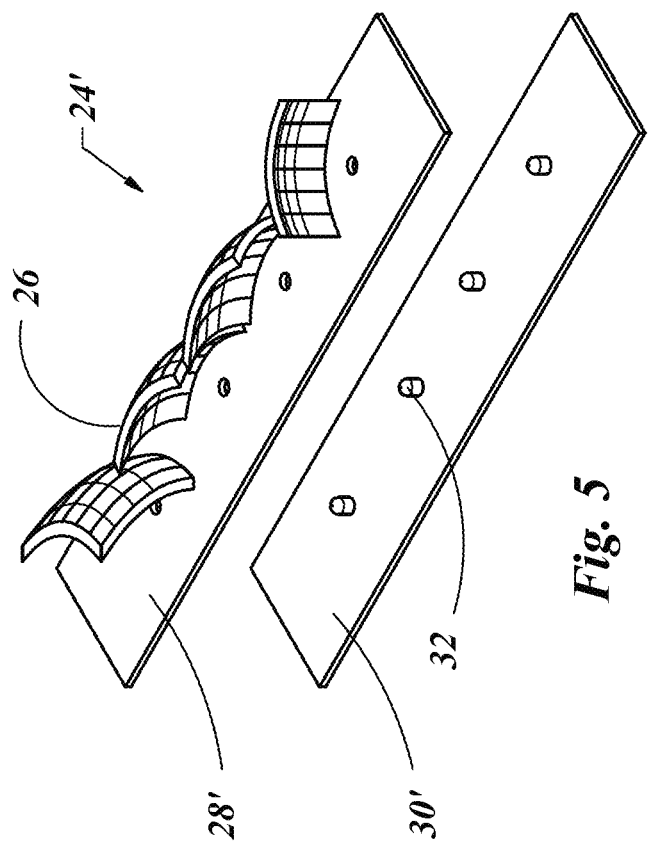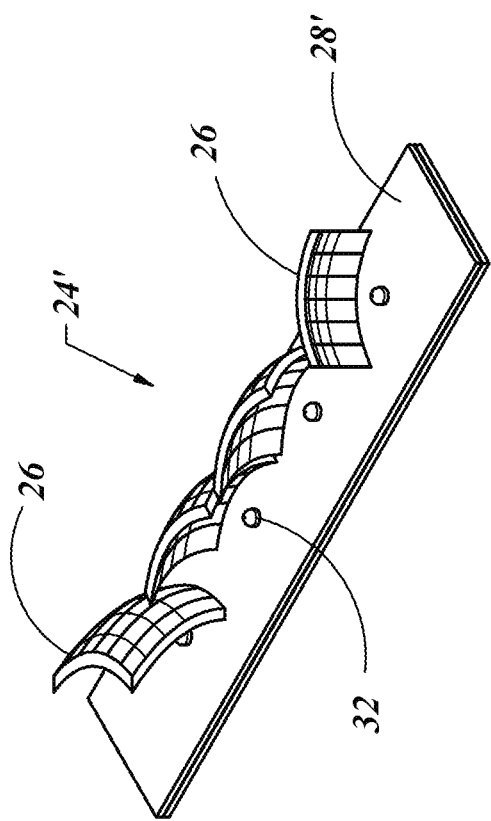

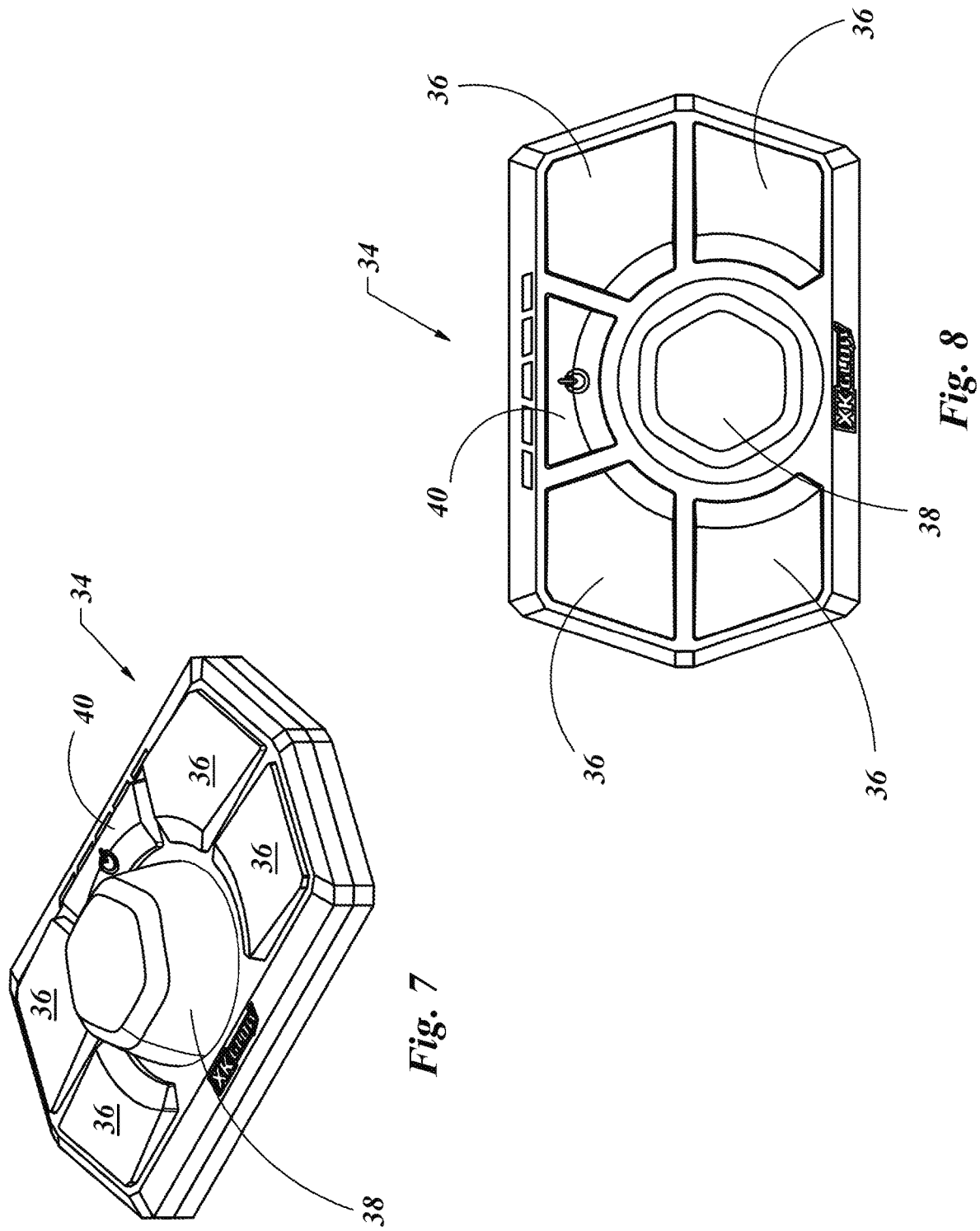

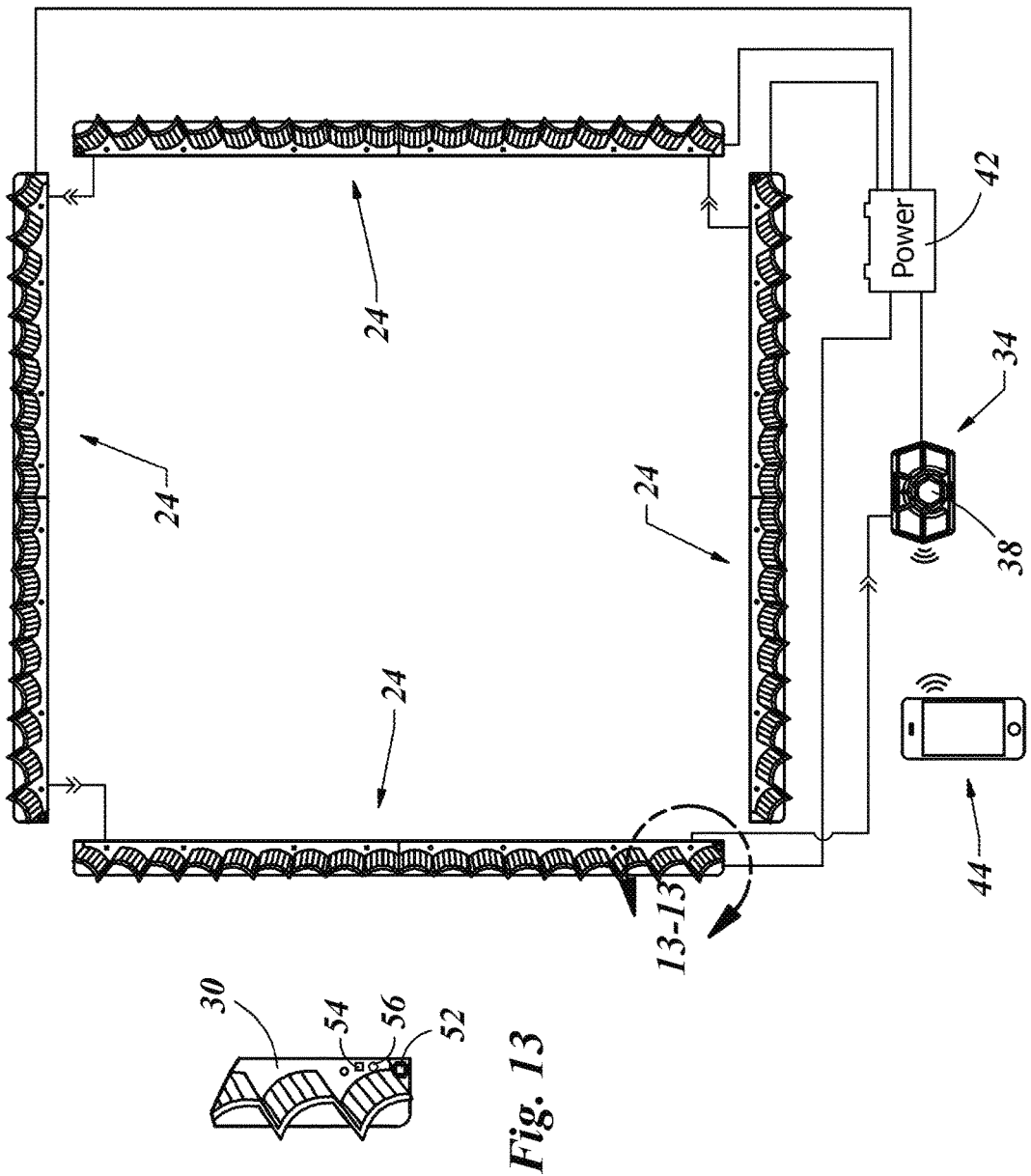

DIRECTIONAL LIGHTING SYSTEM

FIELD OF THE INVENTION

The present invention generally relates to directional lighting systems and, more particularly, to spotlights and other directional lighting systems which may be used on vehicles.

BACKGROUND OF THE INVENTION

Emergency vehicles of all types rely on lighting to alert others and to illuminate specific areas. Law enforcement commonly uses a spotlight or other lighting system as an aid to search for suspects and for the safety of the officers. One of the daily challenges of law enforcement in the pursuit of criminals is many crimes are committed and the criminals flee under the cover of darkness. Traditional spotlights are large lamps mounted to the driver's door and include an operating handle so the driver can manipulate the single beam from side to side.

Mounting a single light on the side of a vehicle has inherent limitations, foremost of which is the limited dexterity of the single light in that there is a police car on one side of the light. Mounting a light on the roof of the vehicle may allow for the user to increase the angular movement of the light, but this location typically necessitates a remote motor to actuate a transmission system that physically moves the light from side to side. The driver's door system may also include some mechanical connection from the operating handle to the lamp, but it may be manually operated. A missing bolt or a buildup of ice could inhibit the movement of the lamp by way of the operating handle, but this purely mechanical system is still likely more reliable than a electro-mechanical system where a broken wire or a burnt out motor can result in the inability of the entire system to move the light from one position to another. At this point the spotlight is of little more value than the headlights already on the vehicle. In addition, actuating a mechanical system, be that by hand or by some motor driven actuator, there is a time lapse for this to reasonably happen to move the light beam. If a series of lights are used, the light capable of being reflected in multiple directions from each light source, turning some lights off and others on to change the lighting direction can be virtually instantaneous as well as require no mechanical wear as there are no moving parts.

Law enforcement is a unique industry in that many times the persons being sought are not anxious to be found. A search and rescue mission is the opposite where the object of the search is as interested in being found as the searches are in finding the lost or injured person. With this in mind, the unwilling to be caught may act to remove or disable the light source that is being used to identify their location. If the suspect fires a weapon at, or otherwise damages, the single spotlight, the entire vehicle mounted spotlight system is useless. So, if anything goes wrong with the single light spotlight, either by the illumination source (single bulb burns out) or the ability to move the spotlight, the system may be compromised, if not completely unusable. Travelers on unfamiliar roads and hunters are some other examples of when it may be desirable to have focused light in a particular area that does not blind oncoming traffic and does not result in excessive energy draw from the power of the vehicle.

It should, therefore, be appreciated that there is a need for a directional lighting system which does not require physical movement of the light source, thereby increasing durability of the system and has more than one light source, providing light source redundancy. The present invention fulfills this need and others.

SUMMARY OF THE INVENTION

The present invention may include a directional lighting system with a plurality of lights positioned on a singular planar surface. A plurality of stationary reflectors may also be provided, each reflector positioned adjacent to each of the plurality of lights. The stationary reflectors may be positioned on the single planar surface in an orientation so as to provide directional illumination of one of the plurality of lights in a different direction relative to another of the plurality of lights. The single planar surface may define a surface of a printed circuit board (PCB) to which the plurality of lights are mounted. The directional lighting system may further include a controller in communication with the plurality of lights. The controller may include one or more preset lighting functions, whereby a user may select one of the one or more preset buttons to illuminate specific lights of the plurality of lights. The communication between the controller and the plurality of lights may be provided by a physical wire or a wireless signal such as a radio frequency signal. The controller may further include a rotating knob, whereby rotation of the rotating knob may provide movement of a lighting pattern provided by the plurality of lights. The movement of the lighting pattern may be in a direction in accordance with movement of the rotating knob. The controller may include a receiver to enable communication between the controller and a computer device such as a smart phone. The controller may include a transmitter to enable communication between the controller and a computer device.

The directional lighting system may also include the plurality of stationary reflectors to be positioned so as to provide illumination across a designated degree span. The system may further include one or more local chips in communication with the plurality of lights. The local chip may provide a controlled illumination of the plurality of lights resulting in more than one lighting pattern. A selector button may also be provided, wherein pressing the selector button communicates with the local chip to create positional information regarding orientation of one directional lighting assembly bar relative to another directional lighting assembly bar. A position light may also be provided, wherein the position light may provide a visual output as to the relative orientation of each directional lighting assembly bar.

The directional lighting system may also include the plurality of lights as being comprised of light emitting diodes. These light emitting diodes may be white light emitting diodes or color light emitting diodes, which may have the illumination colors of white, red, blue and green.

The directional lighting system may also include a controller and a positional sensor in communication with the controller. The positional sensor may provide input to the controller so as to alter the movement of a lighting pattern provided by the plurality of lights. This may cause the lighting pattern to move in a direction in accordance with movement of the positional sensor. The positional sensor may be a physical sensor fixed to a portion of a user, such as the head of the user, such that the movement of the positional sensor resulting from the movement of the portion of the user, results in movement of the lighting pattern in a similar direction. In a similar manner, the positional sensor may be comprised of visual recognition software and a video feed may be used to capture the image of a portion of a user.

Visual recognition software may be used to determine movement of the portion of the user and move the lighting pattern accordingly. The plurality of lights may also be comprised of more than one light positioned adjacent to each of the plurality of the stationary reflectors and one light of the more than one light may not be positioned at the focal point of a stationary reflector. The result may be a light output from the reflector that is above or below the reflected light of an adjacent light.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which:

FIG. 1 is an isometric view of a lighting array of a directional lighting system, presented in accordance with the present invention.

FIG. 2 is a partial detail view of the directional lighting system presented in FIG. 1, cut along line 2-2.

FIG. 3 is an isometric view partially exploded view of the directional lighting assembly as presented in FIG. 1.

FIG. 4 is an isometric detail view of the partially exploded view of the directional lighting system as shown in FIG. 3 cut along line 4-4.

FIG. 5 is an isometric partially exploded view of a directional lighting system as presented in FIG. 1 with only four lighting reflectors.

FIG. 6 is an isometric view of the directional lighting system of FIG. 5, shown as it may be in an assembled state.

FIG. 7 is an isometric view of a controller which may be used to control the directional lighting system as shown in FIG. 1.

FIG. 8 is a plan view of the controller shown in FIG. 7.

FIG. 12 is a schematic of the directional lighting system as shown in FIG. 11, shown the interconnection of each of the individual directional lighting systems, a controller in communication with an electronic device, such as a cell phone.

FIG. 13 is a detail view of a portion of one individual directional lighting systems cut along line 13-13 in FIG. 12.

FIG. 15 is a graphic representation of a light output from a light source of a directional lighting system where the light source is farther away from the reflector.

FIG. 16 is a graphic representation of a light output from a light source of a directional lighting system where the light source is at a center position relative to the reflector.

FIG. 17 is a graphic representation of a light output from a light source of a directional lighting system where the light source is closer to the reflector.

DETAILED DESCRIPTION OF THE INVENTION

Figure 9:
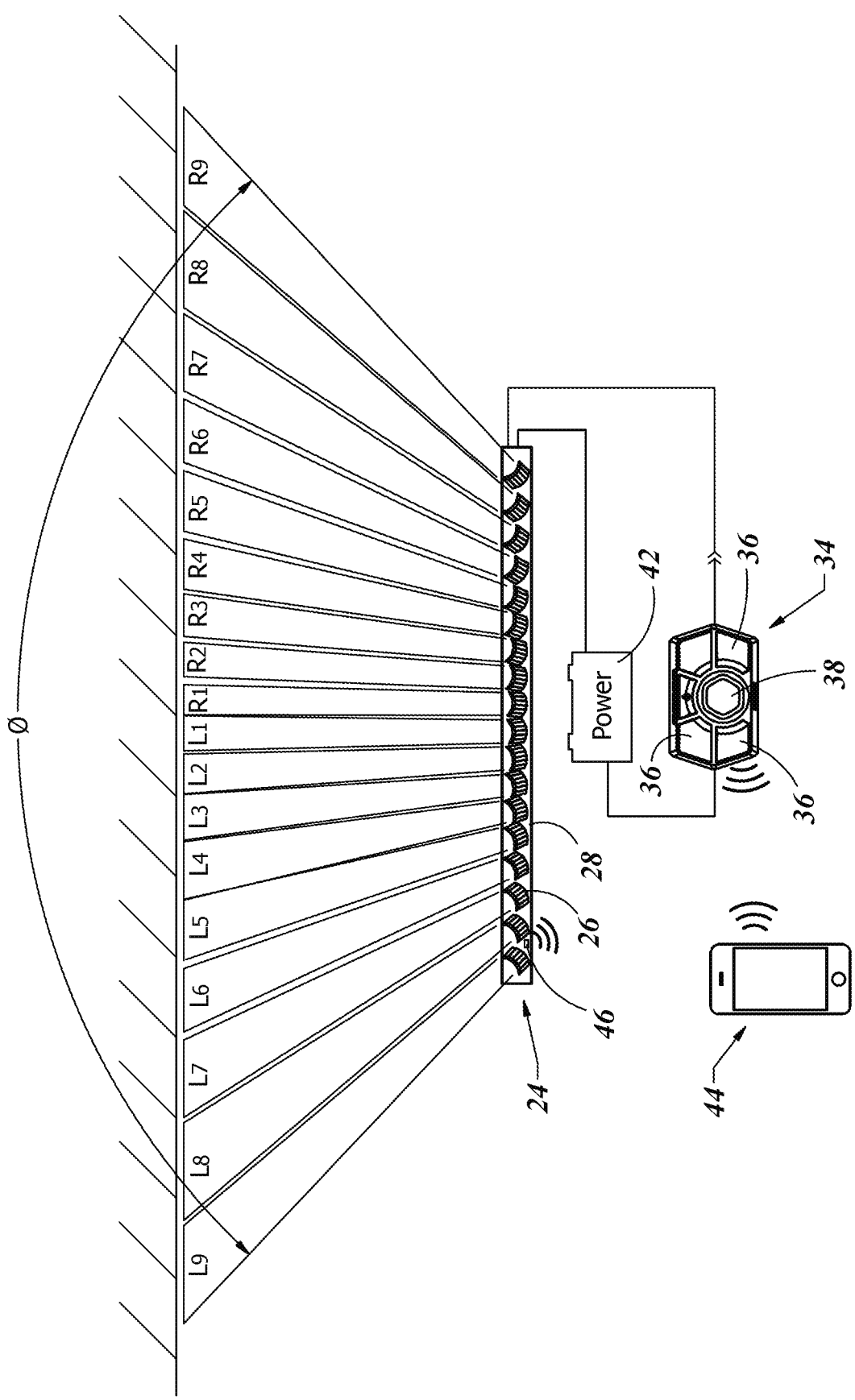
FIG. 9 is a schematic of a directional lighting system as shown in FIG. 1 as it may be used with the controller as shown in FIG. 7.

With reference to the illustrative drawings and particularly to FIGS. 1-4, there is shown a directional lighting assembly 24 which may include a plurality of reflectors 26 each mounted to a reflector plate 28. A printed circuit board (PCB) 30 may support a plurality of light emitting diodes (LED) 32. Each LED 32 may be positioned proximate to each reflector 26 such that the light emitted from the LED 32 may be directed in a specific location by the reflector 26. The PCB 30 may provide electrical communication between a power source (not shown) and each of the LED's 32. In this embodiment, the reflectors 26 may be positioned such that the reflectors 26 on each far end of the directional lighting assembly 24 may direct light emitted from their associated LED 32 away from a center portion of the directional lighting assembly 24. The reflectors 26 located closer to the center of the directional lighting assembly 24 may be positioned to direct light emitted by their associated LED 32 in a more forward direction, thereby not directed toward either far end of the directional lighting assembly 24. In this embodiment, the inventors have selected eighteen reflectors 26 mounted to the reflector plate 28, with each reflector 26 rotated 5° relative to its adjacent reflector 26. It is understood that the number of reflectors 26 on the reflector plate 28 is not considered critical to the novelty of the invention and as such, the number of reflectors 26 on a reflector plate 28 may vary according to the needs of any particular application.

An alternative embodiment is shown in FIGS. 5-6. Here a shortened version of the directional lighting assembly 24' is shown still including a plurality of reflectors 26 each mounted to a short reflector plate 28' which may receive a short PCB 30' which supports a plurality of LEDs 32. In this embodiment, as well as in the previous embodiment, each reflector 26 has one LED 32 located approximately at the center line of the ark of the reflector 26. The reflector 26 may be shaped in the form of a parabolic arc with the LED 32 located at or near a focal point of that parabolic arc. In such a manner, the light emitted from the LED 32 may be reflected by the reflector 26 in a direction consistent with a center line of the parabolic arc of the reflector 26. By positioning multiple reflectors 26 in different relative orientations, a plurality of light beams may be generated in multiple directions as determined by the orientation of the reflector 26 associated with each of the plurality of LEDs 32 which are illuminated at any time.

A controller 34 may be used to control the electrical input to one or more LEDs 32 at any time. By example, a controller 34 is shown in FIGS. 7-8. In this embodiment, the controller 34 may include a plurality of buttons 36 and a rotary knob 38. An on/off button 40 may be provided such that pressing the on/off button 40 may turn the controller 34 on or off, the outcome being the opposite of the previous state prior to pressing the on/off button 40. When turned on, the controller 34 may be used to illuminate one or more of the LEDs 32 alone or in a pattern with other LEDs 32. For example, one button 36 on the controller 34 may be pressed causing all of the LEDs 32 to be illuminated at once. This may result in a broad lighting of an entire area as opposed to a directed light associated with a spotlight. To simulate a spotlight, a different button 36 may be pressed which may result in anywhere from one to four or more adjacent LEDs 32 to be illuminated. Rotating the rotary knob 38 in one direction may provide movement of that illumination pattern of the directional lighting assembly 24 in the same direction as the rotation of the rotary knob 38. More specifically, if for example the four left most LEDs 32 are eliminated when one of the buttons 36 is pressed, by rotating the rotary knob 38 to the right, one or more of the left most LEDs 32 may be turned off and at the same time one or more additional adjacent LEDs 32 toward the right may be illuminated.

In FIG. 9 a more detailed illustration is shown of the previous example. In this figure, there are eighteen reflectors 26 in a directional lighting assembly 24. A representation of the light beams generated by the LED's 32 on the left half of the directional lighting assembly 24 is designated by $L_1$ through $L_9$. In a similar manner, the light beams generated by the LEDs 32 and their associated reflectors 26 on the right half of the directional lighting assembly 24 are designated by $R_1$ through $R_9$. So, being consistent with the previous example, if a button 36 on the controller 34 is pressed, to which a program provides power from the power source 42 to one or more of the LEDs 32 of the directional lighting assembly 24 so as to generate a focused resultant light beam, the position of this light beam may be altered by the rotation of the rotary knob 38. For example, when the appropriate button 36 is pressed a combination of light beams may include $L_2+L_1+R_1+R_2$. A more intense resultant light beam may be provided by increasing the pulse width modulation of the four LEDs 32 which produce the individual light beams. This may be controlled by the controller 34. Alternatively an additional individual one or more light beams, such as L3 and/or R3 may be added to the four beams as previously noted. The difference may be the greater the number of LEDs 32 that are eliminated at any time, but also the wider the resultant light beam becomes.

If searching in a specific area, such as what has been done with a traditional spotlight, it may be desirable to focus the light in a specific location as opposed to blanket the light over a larger area. So a smaller number of individual lights may be desired, such as for example the resultant sum of $L_2+L_1+R_1+R_2$. To move the direction of the resultant light beam to the left or to the right, a user may rotate the rotary knob 38. If the user rotates the rotary knob 38 slightly to the right, the left most LED 32, which produces light beam L2, may be turned off and at the same time the LED 32 which produces light beam $R_3$ may be turned on. This process may continue to the right or to the left cycling the appropriate LEDs 32 to produce a resultant light produced by four adjacent LEDs 32. As noted, the use of four LEDs 32, and therefore four individual light beams to produce a resultant light beam is a matter of choice by the user. A single LED 32 may be used or a multitude of five, six or more adjacent LEDs 32 may be used to produce the desired resultant light beam.

The total angle between $L_9$ and $R_9$ is shown in FIG. 9 to be represented by an angle of illumination ($\Phi$). This angle of illumination ($\Phi$) may be any angle deemed appropriate but it may be considered optimal that this angle be 90°. By using a 90° coverage angle, multiple directional lighting assemblies 24 may be positioned at right angles to one another to obtain fluid coverage from one directional lighting assembly 24 to the next directional lighting assembly 24. By using four directional lighting assemblies 24 in this manner, a coverage of 360° of potential lighting capability may be achieved. The value of this may be more apparent later in this disclosure.

Another detail shown in FIG. 9 includes the use of a computer, or in this case a handheld device such as a cell phone 44. Through Bluetooth or other wireless technology, the cell phone 44 may communicate with the controller 34 to provide similar input to the controller 34 as if the user physically interacts with the controller 34 directly, or by way of the cell phone 44. In a similar manner, the directional lighting assembly 24 may include a local receiver 46 on the PCB 30 of the directional lighting assembly 24. The local receiver 46 may provide a method of communication between the cell phone 44, or the controller 34 directly, without the need for wired communication between the cell phone 44 or the controller 34 and the directional lighting assembly 24.

Figure 10:
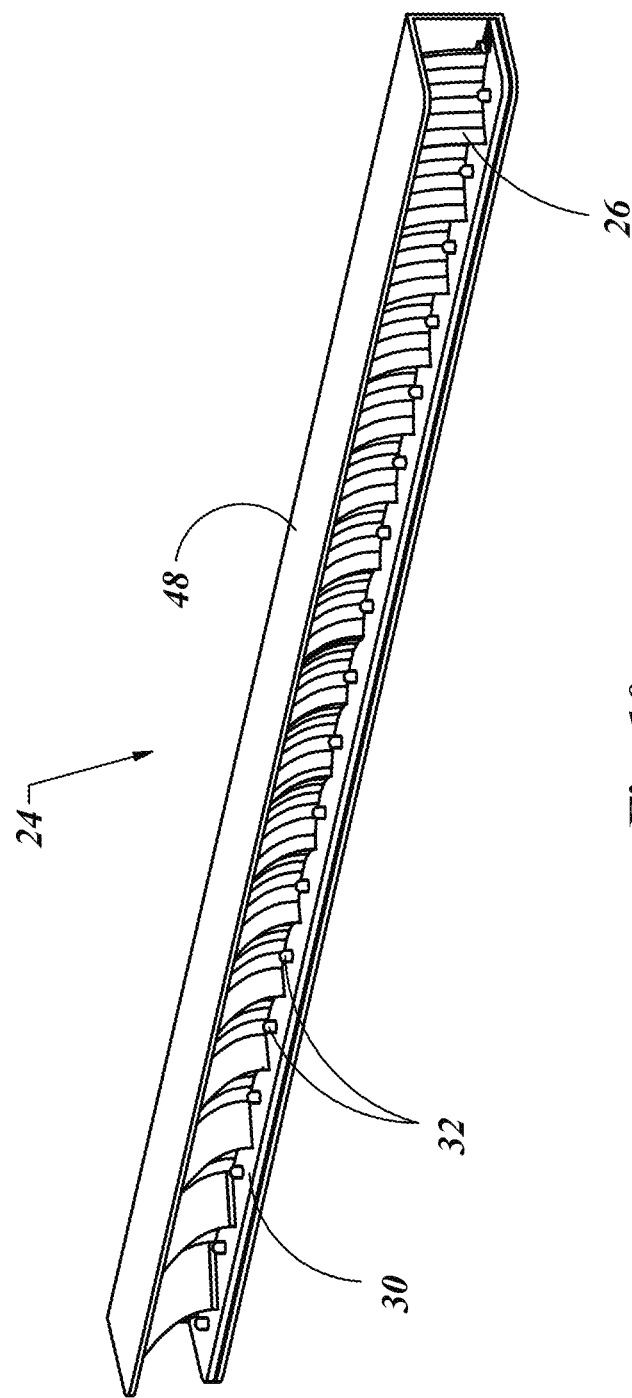
FIG. 10 is an isometric view of a directional lighting system as shown in FIG. 1 with the protective frame.

Referring to FIG. 10, a directional lighting assembly 24 is shown with a plurality of reflectors 26 each with an adjacent LED 32 on mounted to a PCB 30. In this figure, a frame 48 may be provided as a physical protection for the directional lighting assembly 24. The frame 48 may provide a barrier to the elements and other physical objects that may otherwise damage structurally sensitive items such as reflectors 26 the LEDs 32 and the PCB 30. The use of the frame 48 may then allow the directional lighting assembly 24 to be mounted externally to a vehicle or other structure, such as a police car or other emergency vehicle. An example of which is shown in FIG. 11.

Figure 11:
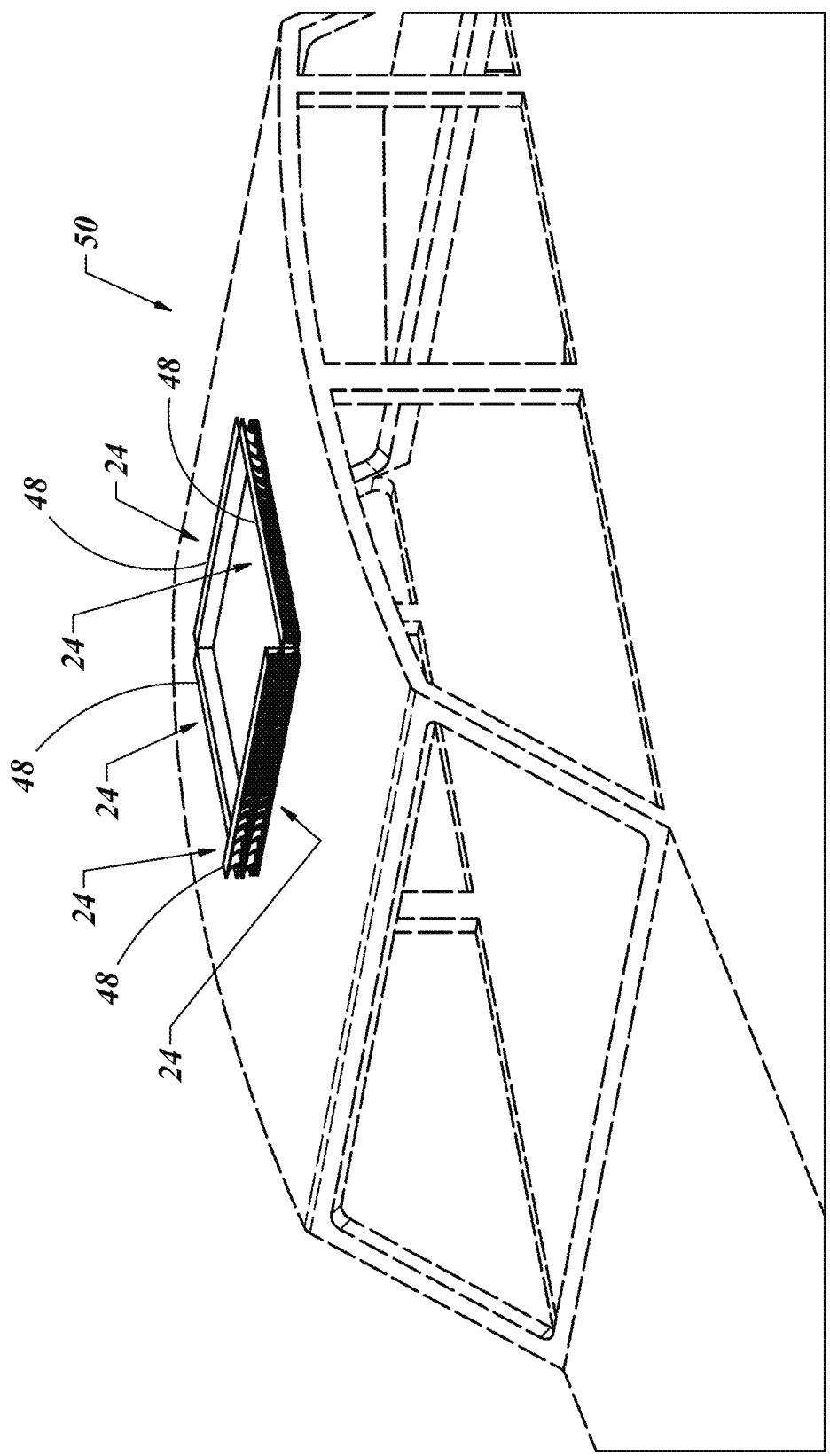
FIG. 11 is an isometric view of a directional lighting system including a plurality of individual directional lighting systems as shown in FIG. 1, and mounted to the top of a vehicle.

In FIG. 11 and further diagrammed in FIGS. 12-13, a plurality of directional lighting assemblies 24 may be provided and oriented orthogonal to one another, thus together comprising the shape of a parallelogram. The directional lighting assemblies 24 may each include a frame 48 so as to equip the directional lighting assemblies 24 to be mounted to the top of a vehicle 50. In that a driver of the vehicle 50 is facing forward most of the time, it may be desirable to position more than one directional lighting assembly 24 facing forward, as is shown in FIG. 11. The two forward facing directional lighting assemblies 24 may be stacked one on top of the other, as shown here, or in any other desired orientation. These two directional lighting assemblies 24 may be synchronized to illuminate together, thus automatically doubling the light output toward the front of the vehicle 50.

This is only one example of a use of stacking multiple directional lighting assemblies 24. Another example may be to position two facing the rear of the vehicle 50. In that situation the top directional lighting assembly 24 may be used to display a running colored pattern such as a red or yellow line from one far end or the other an then back in a continuous loop, thereby alerting oncoming traffic to the presence of the vehicle 50 which may be stopped or moving slowly. The left and right sides may be desired to be have additional light, such as may be the case for security of a fence or other area of interest that would be on the side of the vehicle 50 as the vehicle 50 is in motion.

Referring to FIG. 13, when multiple directional lighting assemblies 24 are used in conjunction with one another, it may be desirable to program the positioning of each directional lighting assembly 24 relative to the other directional lighting assembly 24. To do this, a local chip 52 may be provided on each PCB 30. A program button 54 and an indicator light 56 may also be provided on the PCB 30. This combination may allow a novice user to place multiples of the same directional lighting assembly 24 randomly in a square, rectangle, parallelogram or virtually any other configuration as shown in FIGS. 11 and 12. Once positioned, the directional lighting assemblies 24 may be programmed to their relative positions by pressing the program button 54 a set number of times or pressing and holding the program button 54 down until a desired light color is displayed or a specific number of flashes are produced by the indicator light 56. For example, pressing the program button 54 and holding it until the indicator light 56 flashes once (or turns a specific color) may indicate that directional lighting assembly 24 is facing forward. A similar process may be done providing two flashes or three flashes from the indicator light 56, etc. before releasing the program button 54 to program the local chip 52 in each directional lighting assembly 24 to provide positional orientation as to front, rear, left and right.

When this is completed, all four directional lighting assemblies 24 may work as one system and controlled by the controller 34. For example, rotation of the rotary knob 38 of the controller 34 to move the lighting pattern from right to left as previously disclosed, may continue past the 90° angle of illumination (Φ) of one directional lighting assembly 24 but continue to an adjacent directional lighting assembly 24 and to another to eventually come back to the original illumination position. The lighting pattern produced by the directional lighting assemblies 24 may provide a lighting pattern that may pass through a full 360° without any physical movement of any mechanism of any of the directional lighting assemblies 24.

It is understood that three directional lighting assemblies 24 may be used and each directional lighting assembly 24 may then have an angle of illumination (Φ) of 120° as opposed to 90°, so that three directional lighting assemblies 24 may be used to cover a full 360° of potential illumination. As such, the number of directional lighting assemblies 24 used in any orientation may be subject to the needs of any particular application and not limited to the specific detail of this disclosure.

Figure 14:
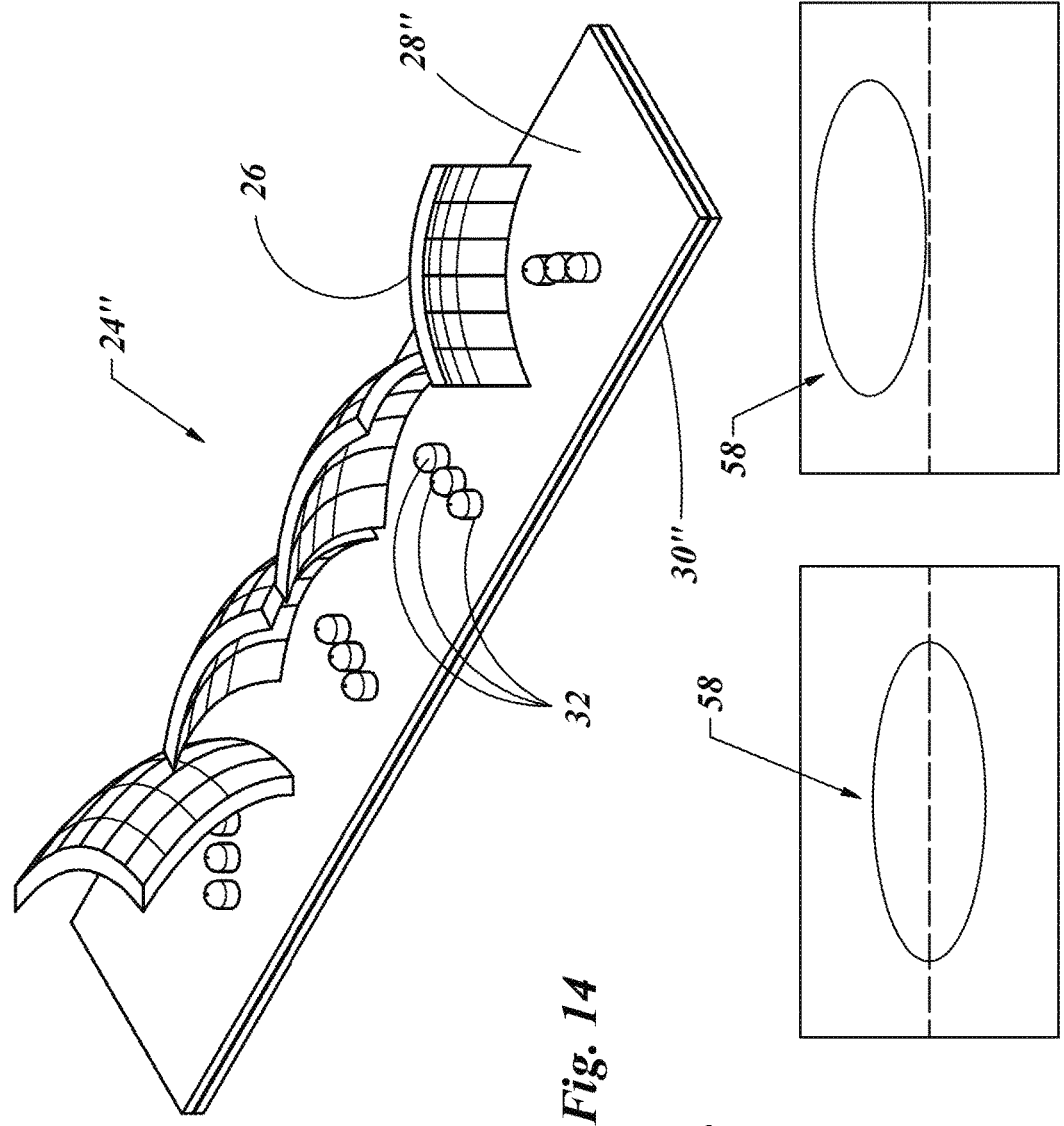
FIG. 14 is an isometric view of a four reflector directional lighting system each reflector including more than one light source.
Figure 18A:
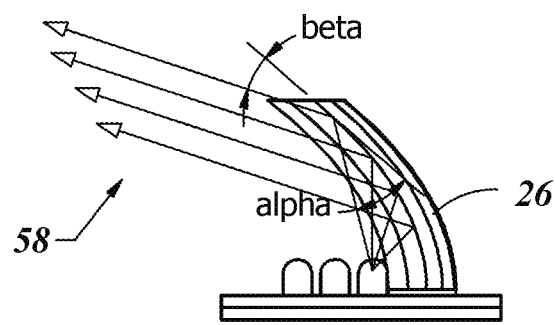
FIG. 18a is a graphic representation of the directional lighting system of FIG. 14, displaying a light output as represented in FIG. 17.
Figure 18B:
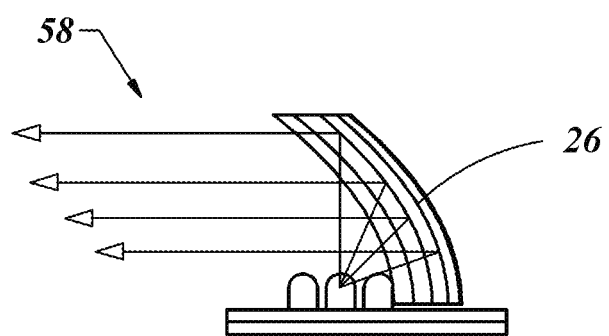
FIG. 18b is a graphic representation of the directional lighting system of FIG. 14, displaying a light output as represented in FIG. 16.

Just as it may be desirable to move a lighting pattern from right to left, it may be desirable to move the illumination vertically. With reference to FIGS. 14-18c, a solution to this is provided. In FIG. 14, a directional lighting assembly 24" is provided with a plurality of reflectors 26 mounted to a reflector plate 28" and a plurality of LED's 32 may be supported by a PCB 30". The difference in this embodiment is for every reflector 26 there may be more than one LED 32. In this embodiment, three LED's 32 are may be positioned along a line which includes a focal point of the reflector 26. In this embodiment, the middle LED 32 may be positioned at a focal point of the reflector 26. This LED 26 may produce a light beam 58 that is somewhat straight forward, as illustrated in FIG. 18b and graphically represented in FIG. 16.

Figure 18C:
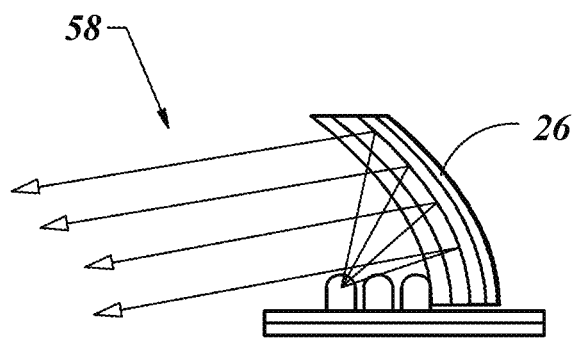
FIG. 18c is a graphic representation of the directional lighting system of FIG. 14, displaying a light output as represented in FIG. 15.

Light reflects off a surface with the angle of incidence (α) being equal to the angle of reflection (β). So placing a light source, such as the LED 32 that is not positioned at the focal point of a reflector 26, may result in a light output from the reflector 26 that is above or below the reflected light generated from an adjacent LED 32. An LED positioned closer to the reflector 26 may provide a smaller angle α, which may in turn result in a smaller angle β, thus providing an elevated light beam 58. This is illustrated in FIG. 18a and graphically presented in FIG. 17. The opposite may be true when the LED 32 is also not at the focal point, but now positioned farther away from the reflector 26. There as the angle α increases so does angle β, as depicted in FIG. 18c, thus producing a lower positioned light beam 58 as graphically illustrated in FIG. 15.

Figure 19:
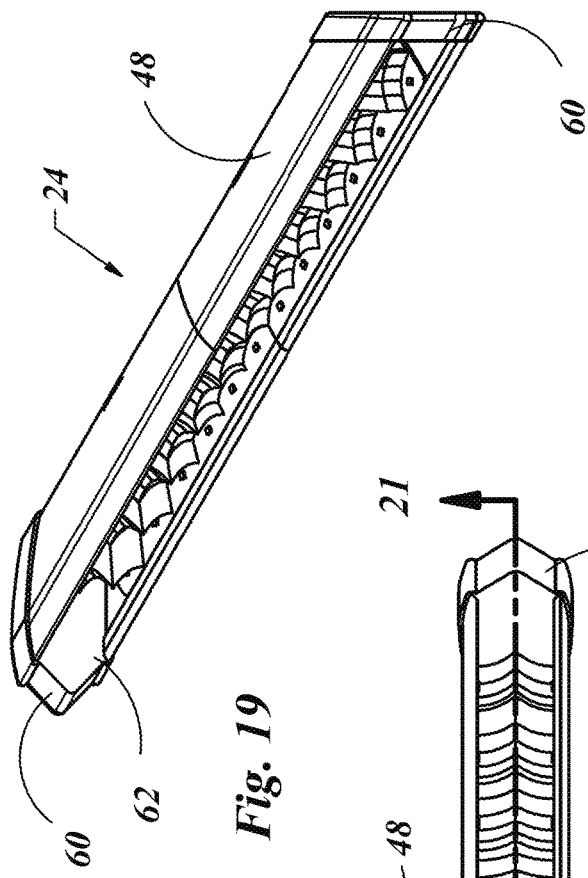
FIG. 19 is an isometric view of a directional lighting system as in FIG. 1, with an enclosed protective cover.
Figure 20:
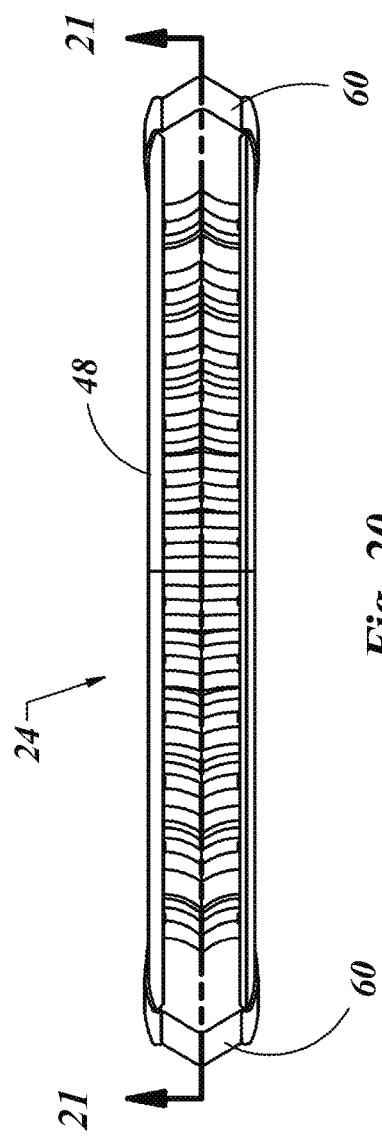
FIG. 20 is a front view of the directional lighting system shown in FIG. 19.
Figure 21:
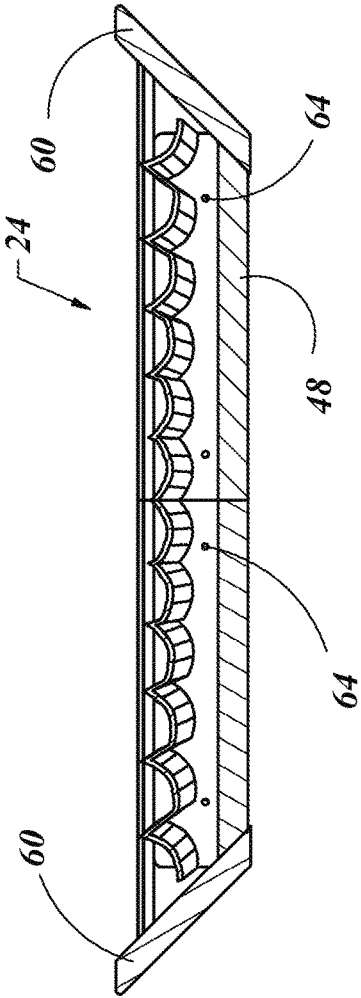
FIG. 21 is a sectional view of the directional lighting system cut along line 21-21 in FIG. 20.

A more detailed frame 48 for the directional lighting assembly 24 is shown in FIGS. 19-21. The frame 48 may also include end caps 60 and a clear lens 62 so as to completely encase the directional lighting assembly 24 and further protect it from the elements and damage from debris. The frame 48 may also include mounting holes 64 to enable easy replacement of a directional lighting assembly 24 within a frame 48. If a frame 48 or a lens 62 of a frame 48 gets damaged, the directional lighting assembly 24 contained therein may be removed and placed in a new frame 48 with minimal effort or reprogramming of the directional lighting assembly 24.

Figure 22:
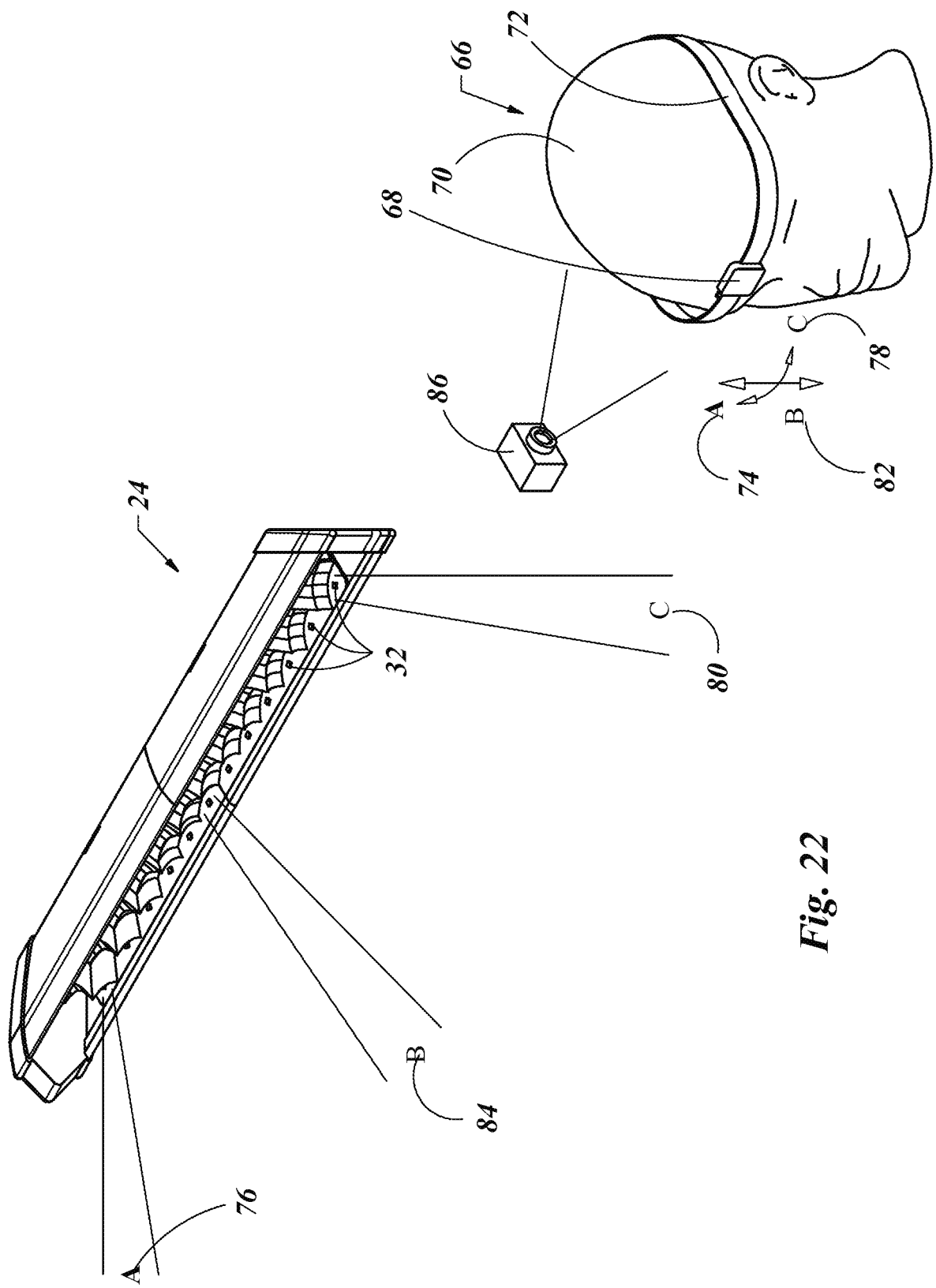
FIG. 22 is a directional lighting system as shown in FIG. 19 and a control system to sense the movement of a user's head and represented by the directional lighting output of the directional lighting system.

The use of the controller 34 to move the location of the light beam up or down, or from right to left by use of the rotary knob 38 has been previously disclosed. It may be desirable in some situations to operate hands free. In the case of a first responder assessing a situation or looking for a suspect or victim, the user may need to concentrate on driving the vehicle 50 and observing the surroundings. In this situation a hands free form of communication between the user and the directional lighting assembly 24 may be desired. In FIG. 22 such a system is shown. The user 66 may have a sensor 68 mounted to their head 70 by way of a head strap 72 or the sensor may be incorporated into the uniform of the user 66, such as by securing the sensor 68 to the hat or glasses of the user 66. In this way, movement of the head 70 of the user 66 may result in movement of the sensor 68.

Movement of the sensor 68 to the right, toward indicator "A" 74 may act in a similar manner to rotating the rotary knob 38 of the controller 34 to the right, thus causing illumination of LED's 32 toward the right end, designated by "A" 76, of the directional lighting assembly 24. In a similar manner, movement of the sensor 68 to the left, or toward indicator "C" 78 may result in illumination of LED's 32 more toward the left end, designated by "C" 80, of the directional lighting assembly 24. When the sensor 68 is positioned relatively straight ahead with respect to the vehicle 50 or the directional lighting assembly 2b4, as designated by the indicator "B" 82, the LED's 24 near the center, as noted by indicator "B" 84 of the directional lighting assembly 24 may be illuminated.

The indicators (76, 80 and 84) of the directional lighting assembly 24 are shown for illustration purposes only. It is understood that more than one LED 32 may be illuminated in a group and that a slight movement of the sensor 68 may result in a slight displacement of the resultant light beam in that direction, not necessarily to the far extreme of the directional lighting assembly 24 as illustrated. In addition, movement up and down of the sensor 68 may result in a vertical displacement of any resultant beam. This may be accomplished by the method to produce vertical movement of a resultant light beam as previously disclosed.

Another method to sense movement of the head 70 of the user 66 may be to use a form of facial recognition software and a camera 86. The camera 86 may be mounted to the vehicle 50, thus providing a x-y-z coordinate reference. As the user 66 moves his head 70 left, right, up or down, the software may recognize that movement and as previously disclosed, adjust the output of the directional lighting assembly 24 accordingly to follow the movement of the head 70 of the user 66. This may accomplish the same result without the need for a specific sensor 68 mounted to the head 70 of the user 66, as the facial features of the user 66 and the software combine to make the sensor 68.

The foregoing detailed description of the present invention is provided for purpose of illustration, and it is not intended to be exhaustive or to limit the invention to the particular embodiment shown. The embodiments may provide different capabilities and benefits, depending on the configuration used to implement key features of the invention.

What is claimed is:

1. A directional lighting system, comprising:
   a plurality of lights positioned on a single planar surface;
   a plurality of stationary reflectors, each positioned adjacent to each of the plurality of lights, the stationary reflectors positioned on the single planar surface in an orientation so as to provide directional illumination of one of the plurality of lights in a different direction relative to another of the plurality of lights;
   a local chip in communication with the plurality of lights, the local chip providing controlled illumination of the plurality of lights resulting in more than one lighting pattern; and
   a selector button, wherein pressing the selector button communicates with the local chip to create positional information regarding orientation of one directional lighting assembly bar relative to another directional lighting assembly bar.

2. The directional lighting system according to claim 1, wherein the single planar surface defines a surface of a printed circuit board (PCB) to which the plurality of lights are mounted.

3. The directional lighting system according to claim 1, further comprising a controller in communication with the plurality of lights, the controller including one or more preset lighting functions, whereby a user may select one of the one or more preset buttons to illuminate specific lights of the plurality of lights.

4. The directional lighting system according to claim 3, wherein the communication between the controller and the plurality of lights is provided by a physical wire.

5. The directional lighting system according to claim 3, wherein the communication between the controller and the plurality of lights is provided by a wireless signal such as a radio frequency signal.

6. The directional lighting system according to claim 3, wherein the controller further includes a rotating knob, rotation of the rotating knob providing movement of a lighting pattern provided by the plurality of lights, the movement of the lighting pattern in a direction in accordance with movement of the rotating knob.

7. The directional lighting system according to claim 3, wherein the controller includes a receiver to enable communication between the controller and a computer device.

8. The directional lighting system according to claim 7, wherein the computer device is a smart phone.

9. The directional lighting system according to claim 3, wherein the controller includes a transmitter to enable communication between the controller and a computer device.

10. The directional lighting system according to claim 1, wherein the plurality of stationary reflectors are positioned so as to provide illumination across a ninety degree span.

11. The directional lighting system according to claim 1, further comprising an indicator light, the indicator light providing a visual output as to the relative orientation of each directional lighting assembly bar.

12. The directional lighting system according to claim 1, wherein further comprising a position light, the position light providing a visual output as to the relative orientation of each directional lighting assembly bar.

13. The directional lighting system according to claim 1, wherein the plurality of lights are comprised of light emitting diodes.

14. The directional lighting system according to claim 13, wherein the light emitting diodes are multi-color light emitting diodes.

15. The directional lighting system according to claim 14, wherein the multi-color light emitting diodes include the illumination colors of white, red, blue and green.

16. The directional lighting system according to claim 1, wherein the plurality of lights is comprised of more than one light positioned adjacent to each of the plurality of the stationary reflectors and one light of the more than one light not being positioned at the focal point of a stationary reflector.

17. A directional lighting system, comprising:
    a plurality of lights positioned on a single planar surface;
    a plurality of stationary reflectors, each positioned adjacent to each of the plurality of lights, the stationary reflectors positioned on the single planar surface in an orientation so as to provide directional illumination of one of the plurality of lights in a different direction relative to another of the plurality of lights; and
    a positional sensor coupled to the head of the user so that movement of the head of the user in a direction results in movement of the lighting pattern in a direction the head of the user is facing.

18. The directional lighting system according to claim 17, wherein the positional sensor is comprised of visual recognition software and a video feed capturing the image of the head of a user, the visual recognition software determining movement of the head of the user and moving the lighting pattern in a direction in accordance with the direction the head of the user is facing.

* * * * *